United States Patent [19]

Aagano

[11] Patent Number: 4,689,690
[45] Date of Patent: Aug. 25, 1987

[54] SYNCHRONIZING SIGNAL GENERATING CIRCUIT

[75] Inventor: Toshitaka Aagano, Kanagawa, Japan

[73] Assignee: Fuji Photo Film Co., Ltd., Kanagawa, Japan

[21] Appl. No.: 647,954

[22] Filed: Sep. 6, 1984

[30] Foreign Application Priority Data

Sep. 9, 1983 [JP] Japan .................................. 58-166299

[51] Int. Cl.[4] .............................................. H04N 1/36
[52] U.S. Cl. .................................... 358/265; 358/268; 358/285
[58] Field of Search ............... 358/264, 265, 150, 147, 358/268, 267, 285

[56] References Cited

U.S. PATENT DOCUMENTS 4,349,847 9/1982 Traino .................................. 358/264

Primary Examiner—Edward L. Coles, Sr.
Attorney, Agent, or Firm—Sughrue, Mion, Zinn, Macpeak, and Seas

[57] ABSTRACT

A synchronizing signal generating circuit for timing the image read-out or recording conducted by scanning a recording medium by a light beam comprises two photodetectors positioned at arbitrary points on a main scanning line for detecting the light beam and generating a first pulse signal and a second pulse signal. The circuit is also provided with a first signal generator for changing the period of a pulse signal output thereby in accordance with an input signal, and a second signal generator which receives the pulse signal output by the first signal generator and the first and second pulse signals output by the photodetectors. The second signal generator counts the number of pulses input by the first signal generator during the scanning from when the first pulse signal is input to when the second pulse signal is input, compares the count with a standard set value, and generates a signal corresponding to a difference therebetween. The signal thus generated is input to the first signal generator, thereby controlling so that a pulse signal consisting of pulses in a number corresponding to the standard set value is output as a synchronizing signal.

7 Claims, 4 Drawing Figures

SYNCHRONIZING SIGNAL GENERATING CIRCUIT

BACKGROUND OF THE INVENTION

1. Field of the Invention

This invention relates to a synchronizing signal generating circuit for timing the read-out or the recording when image read-out or recording is conducted by scanning a recording medium by a light beam emitted by a light source.

2. Description of the Prior Art

In image scanning read-out apparatuses for scanning a recording medium carrying an image stored therein by a light beam in a main scanning direction and in a sub-scanning direction, and detecting the image by use of a photodetector to obtain an image signal, read-out of the image signal is conducted, for example, by integrating the output of the photodetector for a predetermined time within the scanning period each time the position of the light beam is changed by a standard amount in the main scanning direction.

Also, in image scanning recording apparatuses for recording an image in a recording medium by scanning the recording medium by a light beam modulated with an image signal in a main scanning direction and in a sub-scanning direction, recording of the image is conducted, for example, by the modulated light beam each time the position of the light beam is changed by a standard amount in the main scanning direction.

In order to obtain a synchronizing signal when an image is read out or recorded as described above, a beam splitter has heretofore been inserted in the optical path between the means for scanning in the main scanning direction and the recording medium, thereby dividing the light beam into two light beams. One of the light beams thus divided by the beam splitter is used for image read-out or recording. The other is used for scanning on a grid for a position detecting monitor or for a linear encoder, and a signal generated as the scanning is conducted is shaped.

However, the conventional technique as described above has the drawback that, since many parts are required and the size of the apparatus becomes large, the apparatus is not easy to handle or to operate. Further, since the grid is expensive, a high manufacturing cost is required.

Also, in the conventional technique, since ambient dust accumulates on the surface of the grid, it is not always possible to obtain a consistent synchronizing signal.

SUMMARY OF THE INVENTION

The primary object of the present invention is to provide a synchronizing signal generating circuit which accurately generates a synchronizing signal for image read-out or recording.

Another object of the present invention is to provide a synchronizing signal generating circuit which realizes a small apparatus for image scanning read-out or recording and facilitates assembling and handling of the apparatus.

The specific object of the present invention is to provide a synchronizing signal generating circuit which reduces the manufacturing cost of the apparatus for image scanning read-out or recording.

The synchronizing signal generating circuit in accordance with the present invention is characterized by positioning a photodetector at two arbitrary points on a main scanning line in an image scanning read-out apparatus or in an image scanning recording apparatus, detecting the timing of scanning of a light beam between the two points by the photodetectors, and controlling so that predetermined pulses (synchronizing signal) are consistently output within the scanning period.

Specifically, two photodetectors are positioned, for example, at the ends of the scanning region in the main scanning direction. On the basis of output pulses (representing the start and the end of the scanning period) obtained by the photodetectors, a square wave signal representing the scanning period between the two pulses is generated and input to a gate means. Also, pulses of a predetermined period which constitute a synchronizing signal are input from a first signal generating means to the gate means. The output of the gate means is counted and compared with a predetermined standard value. On the basis of a difference therebetween, the period of the pulses of the predetermined period is controlled so that the number of the pulses output during the scanning period is maintained at a predetermined value.

That is, the square wave signal and the pulse signal which has a predetermined period and which is generated by the pulse generating means, i.e. the first signal generating means, are input to the gate means. From the gate means, the pulses which are input within a time corresponding to the scanning period (normally the period for which the square wave signal is at a high level) are output. Then, the pulse signal output from the gate means is input to a counting means which counts the number of pulses of the pulse signal and outputs the count n as a digital value. The count n output from the counting means and a standard set value n0 are input to a comparation means which calculates n0 - n and generates a difference signal, for example, a voltage $\Delta v$, proportional to the calculated difference value. The difference signal is added to the signal previously output, and a signal obtained by the addition is applied to the aforesaid pulse generating means. The pulse generating means generates a pulse signal of a frequency corresponding to the magnitude of the applied signal. The pulse signal thus generated is output by the pulse generating means as the pulse signal to be input to the gate means. In this manner, the circuit system thus constructed constitutes a negative feedback loop. Also, the pulse signal thus generated is used, for example, as a clock signal (synchronizing signal) for the sampling of an A/D converter used for converting an analog image signal detected by a read-out apparatus into a digital image signal. As the pulse generating means, it is possible to use, for example, a voltage control oscillator (VCO). It is also possible to adjust the frequency of the pulse signal to a value higher than the frequency of the desired synchronizing signal (for example, to a value approximately 10 times the frequency thereof). The pulse signal is then input to a frequency dividing circuit which divides the frequency of the pulse signal to obtain the desired synchronizing signal. In this case, it is possible to obtain a more accurate synchronizing signal.

As the means for scanning in the main scanning direction, it is possible to use, for example, a galvanometer mirror. As the photodetectors, it is possible to use, for example, photo transistors. As described above, the two photodetectors are positioned at two arbitrary points on the main scanning line. However, they should preferably be positioned on extensions on both sides of the main scanning line on the recording medium.

In the synchronizing signal generating circuit of the present invention, a negative feedback loop is constructed, and the pulse signal consisting of an equal number of pulses is always generated as the synchronizing signal within the scanning period. Therefore, even when the scanning speed of the means for scanning in the main scanning direction fluctuates, it is possible to obtain a synchronizing signal accurately representing the scanning position of the scanning light beam in conformity with the scanning speed.

Further, in the synchronizing signal generating circuit of the present invention, only two photodetectors are necessary as the optical members and no other optical members are required. Therefore, it becomes possible to realize a control section having a small size. Also, selection of the arrangement of parts constituting the image read-out or recording system becomes more flexible. Since the synchronizing signal generating circuit of the present invention requires no expensive optical member such as a grid, it becomes possible to reduce the manufacturing cost of the apparatus for image scanning read-out or recording. Furthermore, it is not necessary to use a grid, a linear encoder, or the like, for monitoring the scanning position of the scanning light beam, and the synchronizing signal is not affected by dust accumulating on the surface of the grid as in the conventional technique. Therefore, it is always possible to obtain a consistent synchronizing signal. Thus the synchronizing signal generating circuit of the present invention is very advantageous in practical use. When the present invention is applied to an apparatus for image scanning read-out or recording, it is not necessary that control of the synchronizing signal be always conducted during operation of the apparatus. For example, in the case of an image scanning read-out apparatus, control of the synchronizing signal may be conducted only before read-out scanning is conducted for one image original.

DESCRIPTION OF THE PREFERRED EMBODIMENTS

The present invention will hereinbelow be described in further detail with reference to the accompanying drawings.

Figure 1:
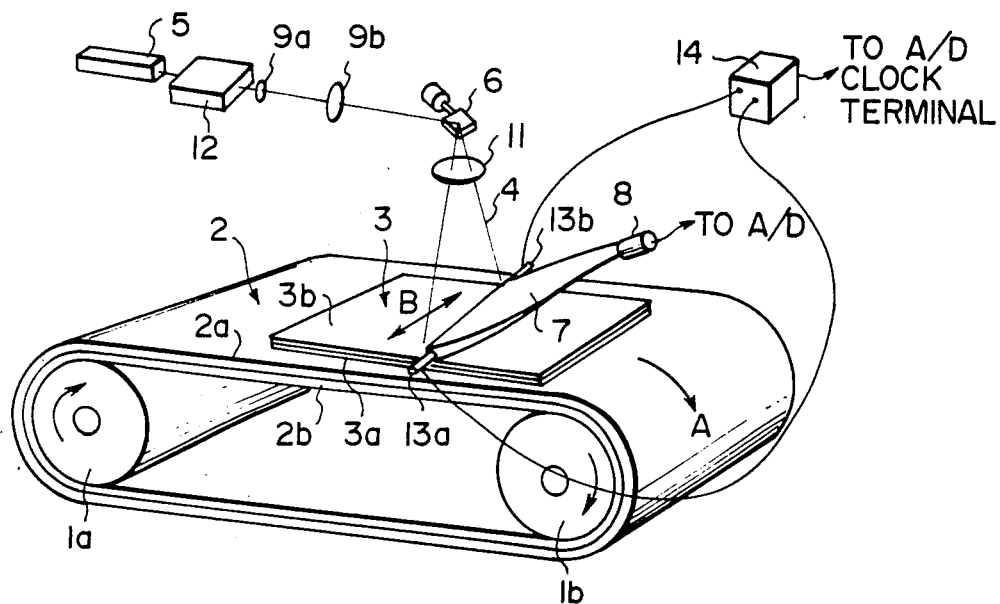
FIG. 1 is a schematic view showing the image scanning read-out apparatus in which an embodiment of the synchronizing signal generating circuit in accordance with the present invention is employed.

FIG. 1 schematically shows a radiation image scanning read-out apparatus in which an embodiment of the synchronizing signal generating circuit in accordance with the present invention is employed. An endless belt 2 is rotatably positioned around a pair of rollers 1a and 1b. A magnet layer 2a is overlaid on the surface of the endless belt 2, and a phosphor sheet 3 is closely contacted with the magnet layer 2a by magnetic attraction. The endless belt 2 is rotated by the rollers 1a and 1b in the direction as indicated by the arrow A. At the same time, a laser beam 4 emitted by a laser beam source 5 is made to impinge upon the phosphor sheet 3 via a galvanometer mirror 6 so that the phosphor sheet 3 is scanned by the laser beam 4 in the direction as indicated by the arrow B normal to the movement direction of the endless belt 2 as indicated by the arrow A. In this manner, the phosphor sheet 3 is two-dimensionally scanned by the laser beam 4. That is, the phosphor sheet 3 is scanned in the movement direction of the endless belt 2 as indicated by the arrow A, i.e. in the sub-scanning direction, and in the main scanning direction as indicated by the arrow B normal to the sub-scanning direction. The endless belt 2 comprises a flexible endless belt-like substrate 2b and the magnet layer 2a overlaid thereon.

The laser beam source 5 may be a He-Ne gas laser tube, an Ar gas laser tube, or the like. At the stage after the laser beam source 5 is positioned an acousto-optic modulator 12 for obtaining the consistent laser beam 4 of a predetermined level. Between the galvanometer mirror 6 and the phosphor sheet 3 is positioned an image forming lens 11 for converging the laser beam 4 onto the phosphor sheet 3. The scanning line formed by the laser beam 4 is adjusted so that it extends to the outsides of both side end portions of the phosphor sheet 3, thereby improving the linearity of the scanning line on the phosphor sheet 3. By utilizing the configuration wherein the laser beam 4 extends to the outsides of the side end portions of the phosphor sheet 3, photo transistors 13a and 13b for detecting the laser beam 4 are positioned so that they can detect the laser beam 4 outside of the side end portions of the phosphor sheet 3. When the photo transistors 13a and 13b detect the laser beam 4, they immediately send high level pulses to a synchronizing signal generation control circuit 14. In the apparatus shown, image read-out is conducted only when scanning is carried out from the photo transistor 13a to the photo transistor 13b. Accordingly, the photo transistor 13a outputs the pulse indicating the start of the read-out scanning period, and the photo transistor 13b outputs the pulse indicating the end thereof.

The phosphor sheet 3 comprises a magnetic layer 3a and a stimulable phosphor layer 3b overlaid thereon. The stimulable phosphor layer 3b carries a radiation image of an object stored therein. When the phosphor sheet 3 is exposed to the laser beam 4, the exposed portion thereof emits light in proportion to the radiation energy stored. The emitted light is guided by a total reflection light guide member 7 fabricated, for example, by forming an acrylic plate, to a photodetector 8 such as a photomultiplier, which detects and converts the light into electric image signals. Thus, the electric image signals are sequentially obtained as the phosphor sheet 3 is two-dimensionally scanned by the laser beam 4. The electric image signals are then digitally converted and subjected to an image processing such as a gradation processing. For this purpose, the photodetector 8 is connected to an A/D converter (not shown) so that the electric image signals obtained by the photodetector 8 are first input to the A/D converter. A synchronizing signal generated by the synchronizing signal generation control circuit 14 is input to a clock terminal of the A/D converter as a clock for synchronization of a sample holding circuit of the A/D converter.

Figure 2:
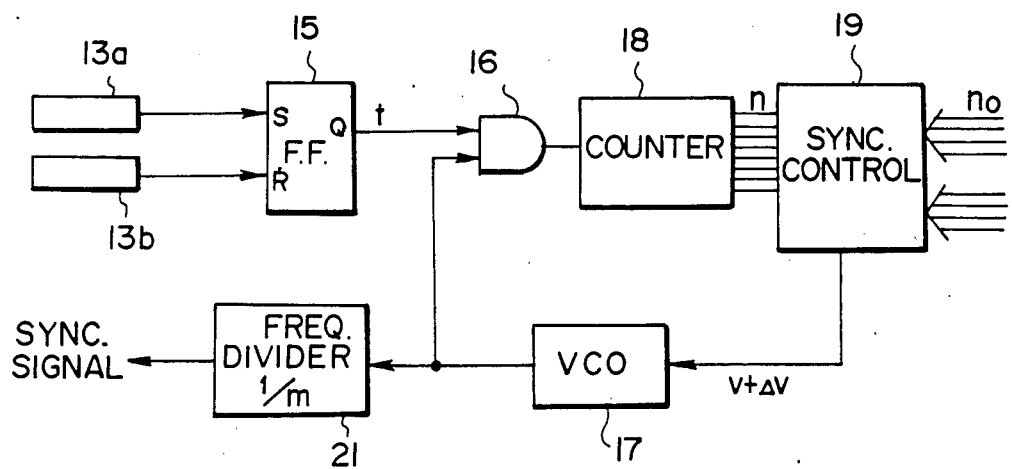
FIG. 2 is a block diagram showing the circuit configuration of the embodiment of FIG. 1, FIGS. 3 and 4 are timing charts showing the timing of signals in the circuit configuration of FIG. 2.
Figure 3:
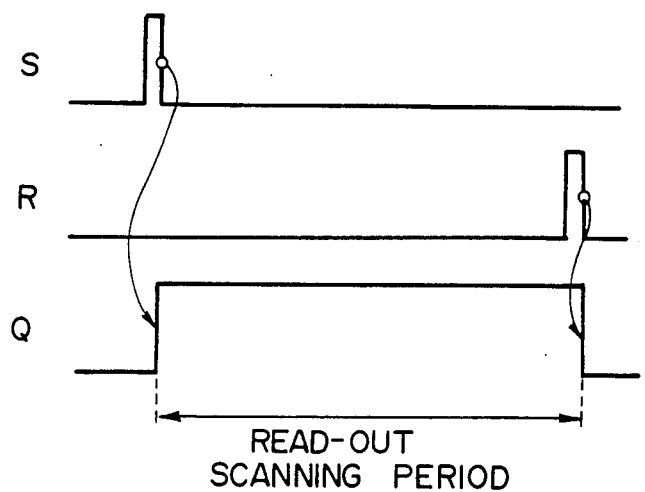
Figure 4:
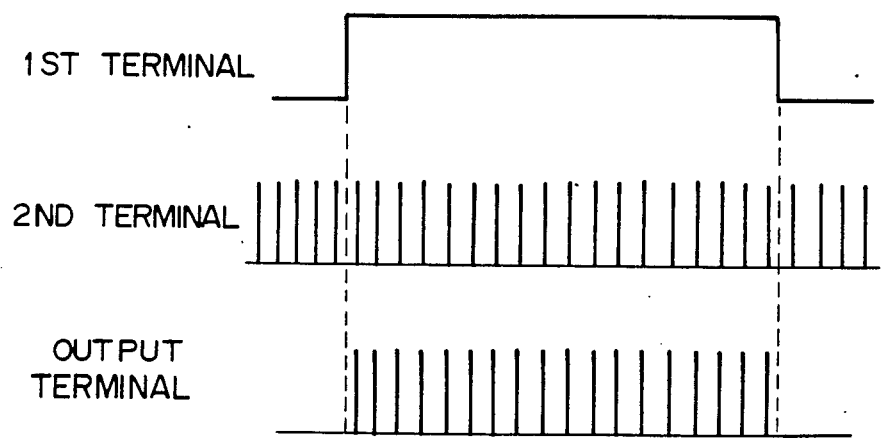

FIG. 2 is a block diagram showing the configuration of the synchronizing signal generating circuit in FIG. 1. The start pulse which is output by the photo transistor 13a and which indicates the start of the read-out scanning period is input to a set terminal S of an R-S type flip-flop 15. The end pulse which is output by the photo transistor 13b and which indicates the end of the read-out scanning period is input to a reset terminal R of the flip-flop 15. At this time, a square wave pulse representing the read-out scanning period by its high level is output by an output terminal Q of the flip-flop 15. The pulse timing is shown in FIG. 3. The square wave pulse is input to a first terminal of an AND gate 16. To a second terminal of the gate 16 is input a synchronizing pulse signal by a voltage controlled oscillator (hereinafter referred to as the VCO) 17. From the output terminal of the gate 16, pulses are output in a number input within the time corresponding to the read-out scanning period. The timing of these pulses is shown in FIG. 4. The pulses output by the gate 16 are input to a counter 18 which counts the pulses and sends the count n to a synchronization control device 19. On the other hand, a standard set value n0 representing the number of pulses which should be generated within the time corresponding to the read-out scanning period is sent from the outside to the synchronization control device 19. The synchronization control device 19 compares the count n with the standard set value n0 and generates a voltage $\Delta v$ proportional to the difference $n0-n$. The voltage $\Delta v$ is superposed on a standard voltage v which has previously been applied to the VCO 17, and is applied to the VCO 17. The VCO 17 generates a synchronizing pulse signal of a frequency corresponding to the applied voltage (i.e. a frequency approximately inversely proportional to the applied voltage). The synchronizing pulse signal thus generated is input to the second terminal of the AND gate 16. Thus, the circuit system as shown in FIG. 2 constitutes a negative feedback control loop. In this manner, the VCO 17 is controlled so that the pulses in an equal number are always generated within the time corresponding to a single read-out scanning period. The frequency of the synchronizing pulse signal is divided by m by a frequency dividing circuit 21 and the frequency-divided signal is input to the sample holding clock terminal of the A/D converter (not shown) for digitally converting the electric image signal. In this embodiment, accuracy of the synchronizing signal is improved by adjusting the frequency of the synchronizing pulse signal to a value m times that of the desired synchronizing signal, and by dividing the frequency of the synchronizing pulse signal at the output stage. The value m should preferably be approximately 10. By sending the synchronizing signal thus controlled to the sample holding clock terminal of the A/D converter, it is possible to digitally convert the electric image signals of a single readout scanning line into picture elements (pixels) of an equal number even when the scanning speed by the means for scanning in the main scanning direction fluctuates. That is, fluctuation of the scanning speed during the image read-out need not be considered in the image processing such as a gradation processing and in image reproduction.

In the embodiment as described above, the synchronization pulse signal is input to the sample holding clock terminal of the A/D converter. However, it may be input to any other circuit element clock terminal insofar as the electric image signal can be digitally converted in synchronization with the synchronizing pulse signal. Also, the present invention is not limited to the circuit configuration as shown in FIG. 2. For example, the flip-flop 15 may be replaced by a D type flip-flop or a J-K type flip-flop.

The embodiment mentioned above is constituted by several circuit elements and two photo diodes and can be fabricated in a small size. Accordingly, it facilitates assembling and handling of the apparatus for image scanning read-out or recording.

I claim:

1. A synchronizing signal generating circuit in an image scanning apparatus for reading out or recording an image by scanning a recording medium by a light beam emitted by a light source in a main scanning direction and in a sub-scanning direction, the synchronizing signal generating circuit comprising:
    (i) a first photodetector and a second photodetector positioned at arbitrary points on the main scanning line of said light beam for detecting said light beam and generating a first pulse signal and a second pulse signal,
    (ii) a first signal generating means for changing the period of a pulse signal output therefrom in accordance with an input signal thereto, and
    (iii) a second signal generating means for receiving the pulse signal of a predetermined period which is input by said first signal generating means, the first pulse signal and the second pulse signal which are input by said first photodetector and said second photodetector, counting the number of pulses which are input by said first signal generating means during the scanning from which said first pulse signal is input to when said second pulse signal is input, comparing the count thus obtained with a predetermined standard pulse number, and generating a signal corresponding to a difference between said count and said predetermined standard pulse number,
    (iv) the signal output by said second signal generating means being input to said first signal generating means, thereby controlling so that a pulse signal consisting of pulses in a number corresponding to said predetermined standard pulse number is output as a synchronizing signal.

2. A synchronizing signal generating circuit as defined in claim 1 wherein said second signal generating means comprises:
    (a) a square wave signal generating means for receiving said first pulse signal and said second pulse signal, and generating a square wave signal representing the scanning period from when said first pulse signal is input to when said second pulse signal is input,
    (b) a gate means for receiving said square wave signal by a first input terminal, receiving the pulse signal of said first signal generating means by a second input terminal, and passing the pulse signal which is input within a time corresponding to said scanning period,
    (c) a counting means for counting the number of pulses of the pulse signal output by said gate means, and sending out the count thus obtained, and
    (d) a comparison means for comparing said count with said standard pulse number, and generating the signal corresponding to the difference between said count and said standard pulse number.

3. A synchronizing signal generating circuit as defined in claim 1 or 2 wherein said first photodetector and said second photodetector are positioned on extensions of the main scanning line outside of said recording medium.

4. A synchronizing signal generating circuit as defined in claim 1 or 2 wherein the frequency of the pulse signal output by said first signal generating means is adjusted higher than the frequency of said synchronizing signal, and is then divided by a frequency dividing circuit to obtain said synchronizing signal.

5. A synchronizing signal generating circuit as defined in claim 1 or 2 wherein said first signal generating means is a voltage control oscillator.

6. A synchronizing signal generating circuit as defined in claim 1 or 2 wherein said first photodetector and said second photodetector are photo transistors.

7. A synchronizing signal generating circuit as defined in claim 1 or 2 wherein said recording medium is a stimulable phosphor sheet, and said image is a radiation image.

* * * * *